Patented Feb. 29, 1944

2,342,980

UNITED STATES PATENT OFFICE 2,342,980

CATALYTIC DEHYDROGENATION OF ISOPROPYLBENZENE

Herbert Muggleton Stanley, Tadworth, and Francis Edward Salt, Banstead, England, assignors to The Distillers Company Limited, Edinburgh, Scotland, a British company No Drawing. Application May 12, 1942, Serial No. 442,724. In Great Britain May 2, 1941

4 Claims. (Cl. 260—668)

In British Patent No. 514,587 there is described a process for the dehydrogenation of isopropylbenzene to alphamethylstyrene in the presence of a vanadium oxide supported catalyst at elevated temperatures. A statement is also made therein to the effect that the presence of water vapour as a diluent reduces the efficiency of the process.

It has now been found that, although the presence of water vapour (e. g. steam) in the reacting gases does reduce somewhat the degree of reaction at any given temperature, nevertheless, by operating at slightly higher temperatures, a satisfactory dehydrogenation can be carried out in the presence of vanadium oxide catalysts.

According to the present invention, a process for the catalytic dehydrogenation of isopropylbenzene comprises passing isopropylbenzene in admixture with water vapour over an oxide of vanadium at a temperature between 500° and 700° C. Preferably the reaction is carried out at a temperature higher than that ordinarily employed in the absence of water vapour; the preferred range of temperature is 560°–600° C. The important discovery has now been made that the presence of substantial proportions of water vapour in the process of the present invention is highly advantageous in retarding the fouling of the catalyst with carbonaceous deposits, with the result that less frequent revivification is necessary when using steam as a diluent, than in the absence of steam. Some indication of the mechanism of the action of steam is afforded by the observation that the gaseous products of dehydrogenation in the presence of excess of steam contain certain proportions of oxides of carbon. This is believed to be due to the reaction between the steam and any carbon deposited on the catalyst surface, whereby the carbon becomes converted into oxides of carbon, and is thereby removed from the catalyst surface. Whatever be the exact mechanism, the practical effect of the use of steam is to prolong the period of useful activity of the catalyst between revivifications from 6 to 10 hours (in the absence of steam) to 50 hours or more when operating in accordance with this invention when excess steam is used. This is very desirable from an industrial standpoint.

The catalyst used in the process is preferably vanadium pentoxide supported on activated alumina granules, or similarly relatively inert support material. A catalyst prepared by impregnating activated alumina granules with 5% by weight of vanadium pentoxide is very satisfactory. Other oxide catalysts are less satisfactory since they are much more sensitive to the presence of steam than is the vanadium oxide catalyst. Thus, zinc oxide and cerium oxide on activated alumina are fairly active catalysts for the dehydrogenation of isopropylbenzene, but their catalytic activities are almost entirely suppressed by the presence of substantial amounts of water vapour. Catalysts containing the oxides of molybdenum and tungsten occupy an intermediate position between zinc oxide and vanadium oxide with respect to their sensitivity to the presence of water vapour.

The dehydrogenation can be carried out at temperatures of 500–700° C., preferably at about 560°–600° C. in tubular reactors which are externally heated to supply the heat necessary to support the highly endothermic dehydrogenation reaction. Alternatively, the reaction can be carried out in a multi-stage unit with interstage preheating.

The proportion of steam employed may be varied within certain limits, but should be preferably 3 or more mols. of steam per mol. of isopropylbenzene fed to the reactor.

Example I

A mixture of steam and isopropylbenzene vapour in the molar ratio of 3.5 mols. of steam to 1 mol. of isopropylbenzene was passed over a catalyst formed by impregnating activated alumina with 5% by weight of vanadium pentoxide. The catalyst was contained in a 1" internal diameter heat-resisting metal tube heated in a tubular electric furnace to a temperature of about 580° C. as measured by a pyrometer in the furnace annulus. The liquor feed rate corresponded to 425 cc./hour of isopropylbenzene per litre of catalyst.

Under these conditions, the initial percentage decomposition of the isopropylbenzene was 27.0% by weight and after a continuous period of operation of 50 hours, it was still maintained at practically the same level. The crude liquid condensate contained 25.6% by weight of alphamethylstyrene, and practically no styrene, while the gaseous products of reaction consisted of about 88% hydrogen and a residue of oxides of carbon and methane. A balance over the whole run indicates that the decomposition of 100 mols. of isopropylbenzene yielded 89 mols. of alphamethylstyrene, 100 mols. of hydrogen and 3 mols. of oxides of carbon.

When decomposition is effected in the absence of steam and water, but under similar conditions of contact time and initial percentage decomposition, the catalyst activity declines rather rapidly. Thus, in a comparison test at a temperature of about 500°–510° C. the percentage decomposition per pass fell from 30% to 24% in 9 hours.

*Example II*

Equimolecular proportions of steam and isopropylbenzene were passed over the same catalyst as used in Example I at 580° C. and at a feed rate of 970 cc./hour of liquid isopropylbenzene per litre of catalyst. The percentage decomposition per pass fell gradually from 25.0% to 20.0% by weight after 24 hours of continuous operation. The bulked crude condensate contained 21.5% by weight of alpha-methylstyrene, no detectable amounts of styrene, and only traces of high-boiling products. For every 100 mols. of isopropylbenzene decomposed, approximately 92 mols. of alpha-methylstyrene were recovered. The gaseous reaction product contained 87.4% by volume hydrogen and 4.2% by volume methane, the residue consisting of oxides of carbon and small amounts of olefins.

What we claim is:

1. A process for the catalytic dehydrogenation of isopropylbenzene which comprises passing isopropylbenzene in admixture with at least one molecular proportion of steam to each molecular proportion of isopropylbenzene over an oxide of vanadium at a temperature between 500° C. and 700° C.

2. A process according to claim 1 wherein the catalyst is vanadium pentoxide supported on a substantially inert support material.

3. A process according to claim 1 wherein the dehydrogenation is effected at a temperature between about 560° and about 600° C.

4. A process according to claim 1 wherein the molar proportion of steam to isopropylbenzene is at least three to one.

HERBERT MUGGLETON STANLEY.
FRANCIS EDWARD SALT.